United States Patent
Tiesler

(10) Patent No.: US 6,637,799 B1
(45) Date of Patent: Oct. 28, 2003

(54) MODULAR SUN VISOR AND METHOD OF ASSEMBLING SAME

(75) Inventor: John M. Tiesler, Harrison Township, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/193,398

(22) Filed: Jul. 11, 2002

(51) Int. Cl.$^7$ ................................................ B60J 3/00
(52) U.S. Cl. ..................... 296/97.1; 296/97.5; 296/97.9; 362/492
(58) Field of Search .............................. 296/97.1, 97.5, 296/97.9, 97.12, 97.2, 97.4, 97.13, 97.6; 248/683; 362/492

(56) References Cited

U.S. PATENT DOCUMENTS

| | | | |
|---|---|---|---|
| 2,057,009 A | 10/1936 | Chadwick | |
| 2,901,038 A | 8/1959 | Herr et al. | |
| 3,193,323 A | 7/1965 | Herr et al. | |
| 3,405,969 A | 10/1968 | Creel | |
| 3,827,748 A | 8/1974 | Herr et al. | |
| 4,174,864 A * | 11/1979 | Viertel et al. | 296/97.5 |
| 4,458,938 A | 7/1984 | Viertel et al. | |
| 4,477,116 A | 10/1984 | Viertel et al. | |
| 4,491,899 A | 1/1985 | Fleming | |
| 4,500,131 A * | 2/1985 | Fleming | 296/97.12 |
| 4,623,188 A * | 11/1986 | Juraschek et al. | 296/97.5 |
| 4,626,019 A | 12/1986 | Tung et al. | |
| 4,989,911 A | 2/1991 | Van Order | |
| 5,011,211 A * | 4/1991 | Svensson | 296/97.1 |
| 5,056,853 A * | 10/1991 | Van Order | 296/97.9 |
| 5,244,244 A | 9/1993 | Gute et al. | |
| 5,267,090 A * | 11/1993 | Dowd et al. | 296/97.5 |
| 5,278,736 A * | 1/1994 | Falcoff et al. | 296/97.5 |
| 5,308,137 A | 5/1994 | Viertel et al. | |
| 5,314,227 A * | 5/1994 | Weiland et al. | 296/97.9 |
| 5,374,097 A * | 12/1994 | George et al. | 296/97.5 |
| 5,556,154 A | 9/1996 | Vaxelaire | |
| 5,727,837 A * | 3/1998 | Viertel | 296/97.1 |
| 5,823,503 A * | 10/1998 | Wasserman | 248/683 |
| 5,823,603 A | 10/1998 | Crotty, III | |
| 5,895,087 A | 4/1999 | Viertel et al. | |
| 6,007,136 A | 12/1999 | Zittwitz et al. | |
| 6,024,399 A | 2/2000 | Viertel et al. | |
| 6,033,005 A | 3/2000 | Crotty, III | |
| 6,076,947 A * | 6/2000 | Miller | 362/492 |
| 6,131,985 A | 10/2000 | Twietmeyer et al. | |
| 6,220,644 B1 | 4/2001 | Tiesler et al. | |
| 6,234,558 B1 * | 5/2001 | Curtindale | 296/97.9 |
| 6,264,352 B1 * | 7/2001 | Zapinski | 362/492 |
| 6,302,467 B1 | 10/2001 | Crotty, III et al. | |
| 6,325,527 B1 * | 12/2001 | Lee | 362/492 |
| 6,347,824 B1 | 2/2002 | Akouri et al. | |
| 6,499,868 B1 * | 12/2002 | Kerul, Jr. | 362/492 |
| 6,543,832 B1 * | 4/2003 | Bogdanski et al. | 296/97.1 |

FOREIGN PATENT DOCUMENTS

JP          59014516 A          1/1984

OTHER PUBLICATIONS

U.S. patent application Ser. No. 10/083,244, Tiesler et al., filed Feb. 25, 2002.

* cited by examiner

Primary Examiner—Kiran Patel

(57) ABSTRACT

A modular sun visor includes a visor bezel having a center support rod, an elbow rod subassembly, and a visor blade. The visor bezel is pivotally and slidingly attached to the elbow rod subassembly, which is configured to be attached to the interior of a vehicle. The center support rod of the visor bezel is selectively attachable to the vehicle at a center support. The visor blade is chosen from an inventory of differently sized visor blades, any one of which is attachable to the visor bezel. When a sun visor is required for a different make or model of vehicle, only the visor blade is changed; thus, production and inventory costs are reduced.

17 Claims, 4 Drawing Sheets

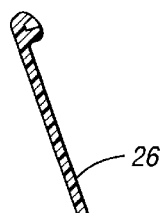
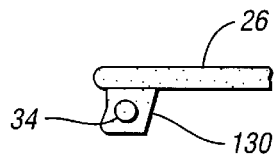
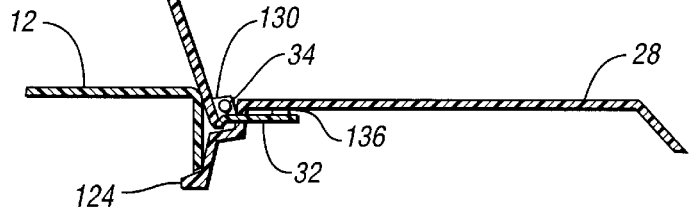
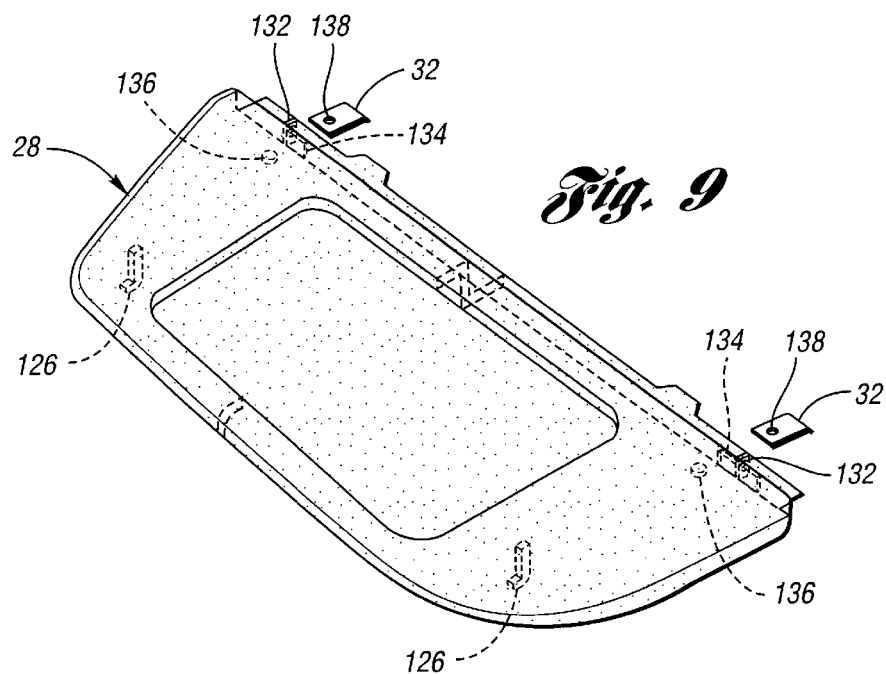
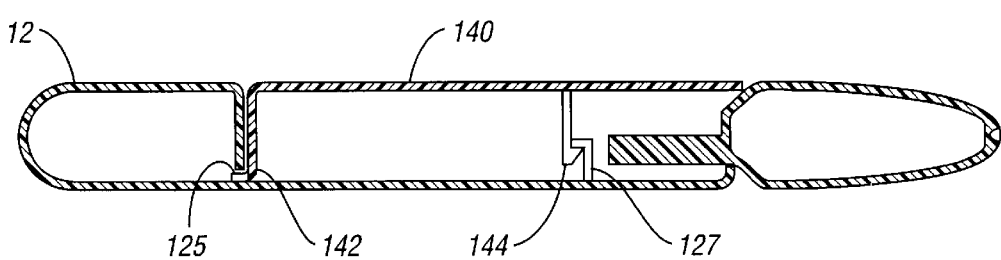

MODULAR SUN VISOR AND METHOD OF ASSEMBLING SAME

BACKGROUND OF THE INVENTION

1. Field of the Invention

The present invention relates to a modular sun visor and a method of assembling a sun visor.

2. Background Art

The use of sun visors in vehicles is well known. Attached to the vehicle roof adjacent to the windshield, sun visors are made in various sizes and are made from a variety of materials. Typical sun visors comprise a stiff inner core, often made of a rigid polymer, surrounded by a cloth covering. Because of the wide variation in the size of vehicles, many different sizes of sun visors are necessary to accommodate the needs of vehicle manufacturers. In a standard manufacturing process, each different size of sun visor may require different tooling, which adds to production costs. In addition, inventory costs can increase as the many different sizes of sun visors are warehoused.

One attempt to make a sun visor more modular, and therefore increase the number of components common to different sizes of sun visors, is described in U.S. Pat. No. 6,131,985 issued to Twietmeyer et al. on Oct. 17, 2000. Twietmeyer et al. describes a sun visor with a variety of modular core components covered with an outer covering. The core components can be assembled such that they can be used in visor assemblies for a number of different makes and models of vehicles. However, in order to accommodate different sizes of outer coverings, the core component assemblies must themselves be manufactured in different lengths. Hence, at least some of the shortcomings of prior art sun visors remains.

Accordingly, it is desirable to provide a modular sun visor that overcomes the shortcomings of prior art sun visors by further reducing the number of differently sized components that are required to produce sun visors of different sizes.

SUMMARY OF THE INVENTION

It is an aspect of the present invention to provide a modular sun visor that can be used on a wide variety of vehicle makes and models.

It is another aspect of the invention to provide a modular sun visor that reduces tooling changes and production setup time for the sun visor manufacturer.

It is a further aspect of the invention to provide a modular sun visor that reduces production and inventory costs.

Accordingly, a sun visor assembly for use in a vehicle is provided that comprises an elbow rod subassembly configured to be attached to the vehicle. A visor bezel having a support structure is pivotally and slidingly attached to the elbow rod subassembly. Also included in the sun visor assembly is a visor blade, which is attached to the visor bezel.

Another aspect of the invention provides a system of modular sun visors that comprises a plurality of visor bezels, each of which includes a support structure. The system also includes a plurality of visor blades, each one differing from the others by at least one dimension. Each of the visor blades is configured for attachment to any one of the visor bezels.

A further aspect of the invention provides a method of assembling a sun visor for a vehicle that comprises providing a visor bezel having a support structure. The visor bezel is configured to be attached to any visor blade chosen from an inventory of differently sized visor blades. A visor blade is chosen from the inventory of differently sized visor blades, and is then attached to the visor bezel.

The above object and other objects, features, and advantages of the present invention are readily apparent from the following detailed description and best mode for carrying out the invention when taken in connection with the accompanying drawings.

BRIEF DESCRIPTION OF THE DRAWINGS

FIG. 7 is a fragmentary side sectional view showing a portion of the vanity subassembly shown in FIG. 6;

FIG. 8 is a fragmentary side sectional view showing the lid cam in detail;

FIG. 9 is a partially exploded perspective view of the vanity lid; and

FIG. 10 is a side sectional view of a sun visor assembly including a cover plate but no vanity subassembly.

DETAILED DESCRIPTION OF THE PREFERRED EMBODIMENT(S)

Figure 1:
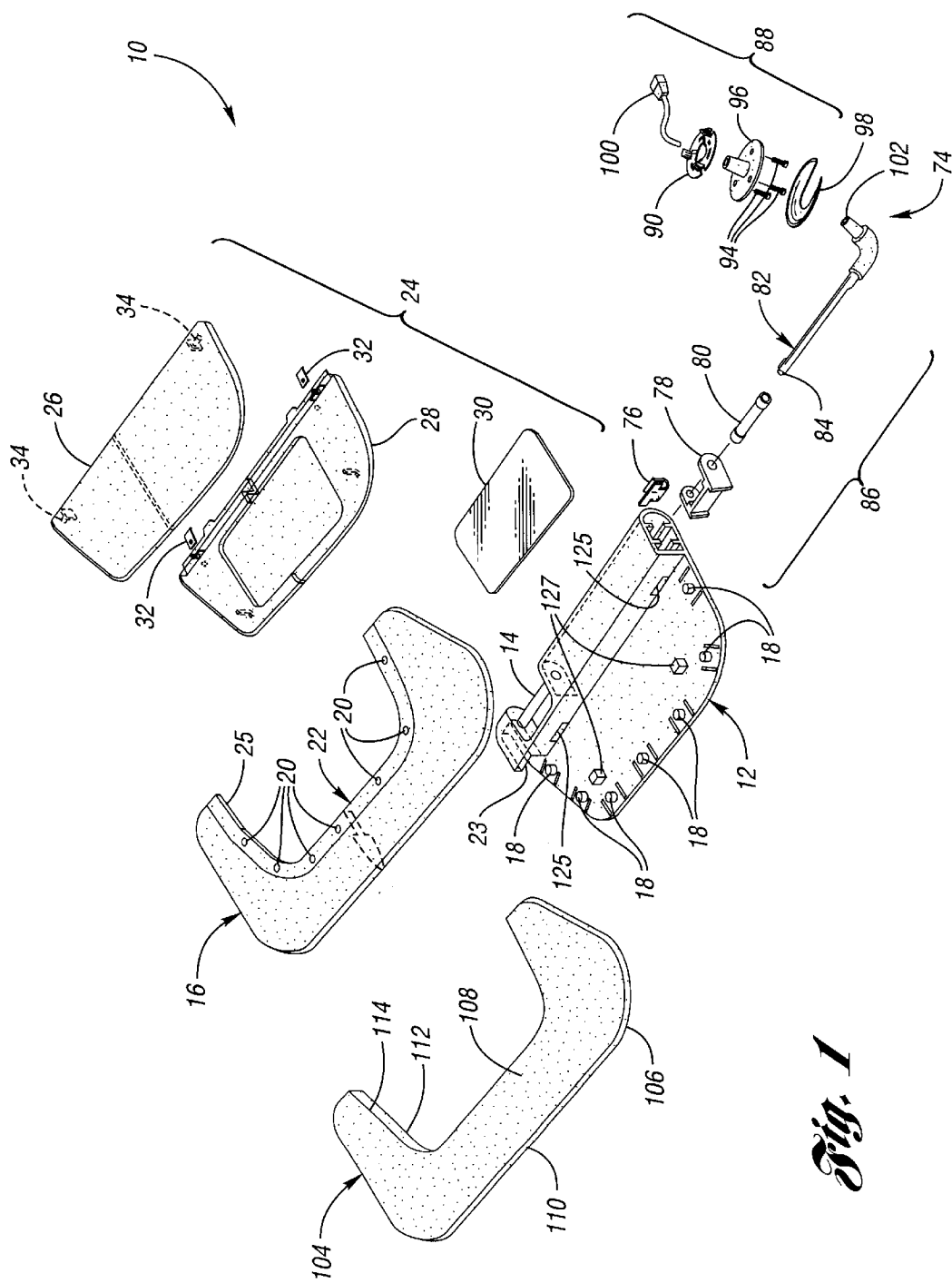
FIG. 1 is an exploded perspective view of a sun visor assembly in accordance with the present invention.

FIG. 1 shows an exploded perspective view of a sun visor assembly 10 in accordance with the present invention. Included in the sun visor assembly 10 is a base portion, or visor bezel 12, that has a support structure such as center support rod 14. Attached to the visor bezel 12 is a visor blade 16, which can be a unitary structure, or may be manufactured from more than one piece. The visor bezel 12 and the visor blade 16 are typically made from a molded heat resistant polymer such as a high heat acrylonitrile butadiene styrene (HH ABS), though the use of other polymers, and even non-polymeric materials, is contemplated. Moreover, the visor bezel 12 and the visor blade 16 need not be made from the same material. Though any one of a number of methods can be used to attach the visor blade 16 to the visor bezel 12—for example, sonic welding—this embodiment contemplates the use of a heat stake process. Heat stake posts 18, attached to the visor bezel 12, are configured to mate with apertures 20 located in a first portion 22 of the visor blade 16.

The visor bezel 12 includes an undercut portion 23 that is configured to receive a flanged portion 25 of the visor blade 16. This makes it easier to attach the visor blade 16 to the visor bezel 12, and helps to eliminate gaps that may otherwise be present between them. After the visor blade 16 is heat staked to the visor bezel 12, a vanity subassembly 24 is installed. The vanity subassembly 24 includes a vanity lid 26, a vanity bezel 28, and a mirror 30. Lid springs 32 and lid pivot pins 34, help to keep the vanity lid 26 open when the mirror 30 is being accessed, and closed when the vanity is not in use. In this embodiment, the pivot pins 34 are integral with the vanity lid; however, other embodiments may include separate pivot pins that are attached in an assembly operation.

Figure 2:
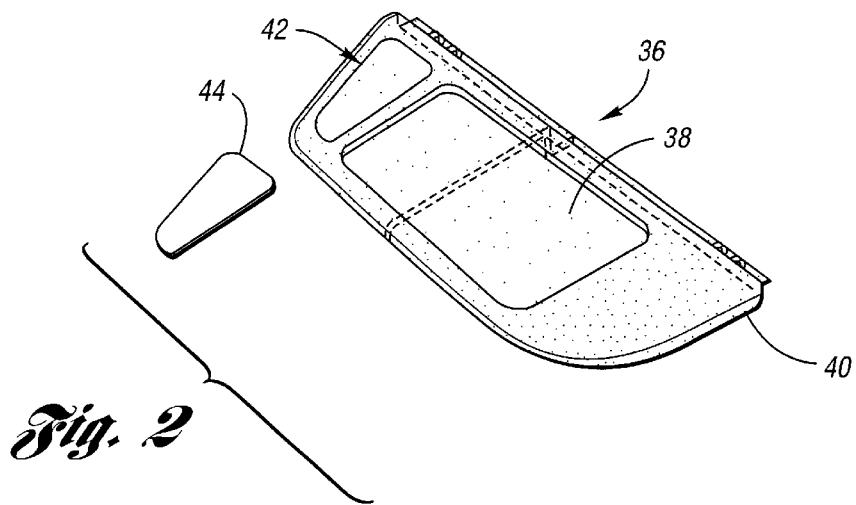
FIG. 2 is a partially exploded perspective view of one configuration of an illuminated vanity subassembly for use in the present invention, the vanity subassembly having one light.
Figure 3:
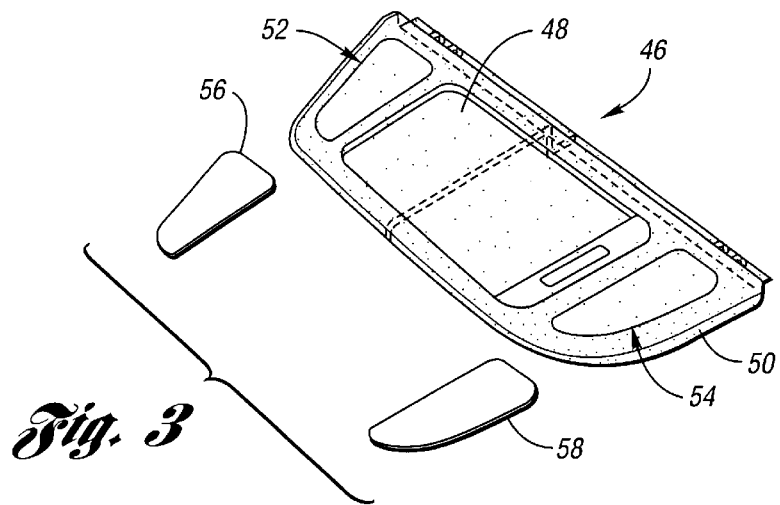
FIG. 3 is a partially exploded perspective view of a second configuration of an illuminated vanity subassembly for use in the present invention, the vanity subassembly having two lights.
Figure 4:
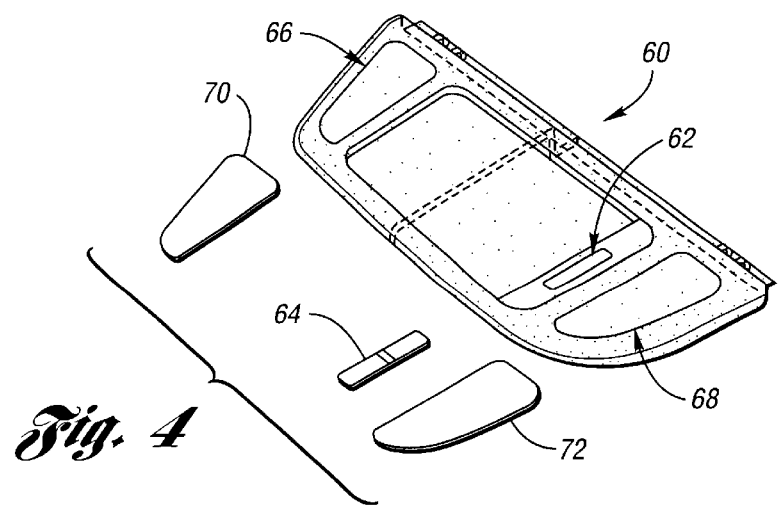
FIG. 4 is a partially exploded perspective view of a third configuration of an illuminated vanity subassembly for use in the present invention, the vanity subassembly having two lights and a dimmer switch.

The vanity subassembly 24 is but one of a number of styles of vanity subassemblies that can be used with the present invention. For example, although the vanity subassembly 24 has a mirror 30, no illuminating lights are provided in this embodiment. Conversely, FIGS. 2–4 show alternate constructions of illuminated vanity subassemblies configured for use in the modular sun visor of the present invention. FIG. 2 shows a vanity subassembly 36 having a vanity lid 38 that covers a mirror (not visible in this view), and is attached to a vanity bezel 40. In addition, the vanity subassembly 36 includes a light 42 that is covered by a lens 44. FIGS. 3 and 4 show other alternative vanity subassemblies. In FIG. 3, a vanity subassembly 46 has a vanity lid 48 that covers a mirror (not visible) and is attached to a vanity bezel 50. In this embodiment there are two lights 52, 54, which are covered by lenses 56, 58, respectively. Another variation is shown in FIG. 4, where a vanity subassembly 60 includes a dimmer switch subassembly 62. The dimmer switch subassembly 62 includes a dimmer switch button 64 that is easily actuated by a vehicle occupant to dim lights 66, 68. As with the other illuminated vanity subassemblies, the vanity subassembly 60 includes lenses 70, 72 to cover the lights 66, 68, respectively.

Also included in the sun visor assembly 10, is an elbow rod subassembly 74, shown in FIG. 1. The elbow rod subassembly 74 includes a detent clip 76 that is held by a detent clip carrier 78. A detent sleeve 80 is held by the detent clip 76, and is configured to receive an elbow rod 82. The elbow rod 82 has an end portion 84 that is swaged after insertion through the detent sleeve 80. This leaves the elbow rod 82 free to slide within the detent sleeve 80, but helps to ensure that it will not pull completely out of the sleeve 80. After the detent clip 76, the detent sleeve 80, and the elbow rod 82 are assembled with the detent clip carrier 78, the detent clip carrier 78 is sonic welded to the visor bezel 12. Thus, a first portion 86 of the elbow rod subassembly 74 allows the visor bezel 12 to pivot and slide along the length of the elbow rod 82. In the embodiments shown in the figures, the visor bezel 12 is attached to the elbow rod subassembly 74 such that the visor blade 16 does not contact the elbow rod subassembly 74.

A second portion 88 of the elbow rod subassembly 74 is configured to allow the sun visor assembly 10 to be pivotally attached to the interior of a vehicle. An outboard clip 90 snaps into a roof portion 92 of the vehicle (see FIG. 5), and is configured to receive screws 94 which hold in place an outboard bezel 96. A trim cap 98 covers the screws 94 to present a finished surface to the vehicle occupants. Also shown in FIG. 1 is a portion of a wiring harness 100, which can be fed through an opening 102 in the elbow rod 82 to provide power to the lighted vanity subassemblies shown in FIGS. 2–4.

The visor bezel 12 will often be manufactured with finished, appearance surfaces to complement the interior of a vehicle. Likewise, it is possible to manufacture the visor blade 16 with similar or matching appearance surfaces. Thus, the sun visor assembly 10 may be installed in a vehicle without the need for additional processing steps to finish the surfaces of the visor bezel 12 or the visor blade 16. In some applications however, it may be found that a cloth-covered visor blade complements the vehicle interior better than an as-molded polymeric blade. In such situations, a cloth visor blade cover 104 can be used to achieve the desired appearance. The visor blade cover 104 can be made from any suitable material, though in this embodiment, first and second portions 106, 108 are made from a foam-backed woven cloth material, and are electric welded along an edge 110.

After the visor blade cover 104 is welded along the edge 110, it is slipped over the visor blade 16, and secured by any one of a number of methods. For example, first and second portions 106, 108 of the visor blade cover 104 can be welded directly to the visor blade 16. Alternatively, edges 112, 114 of the visor blade cover 104 can be welded together to form a seam. After the visor blade cover 104 is thus secured, it is pierced in locations coincident with the apertures 20 of the visor blade 16. This facilitates heat staking of the visor blade 16 and visor blade cover 104 to the visor bezel 12. In an alternative embodiment, a visor blade cover may be configured to also cover some or all of the visor bezel, thereby giving most or all of the sun visor assembly a cloth-covered surface.

Figure 5:
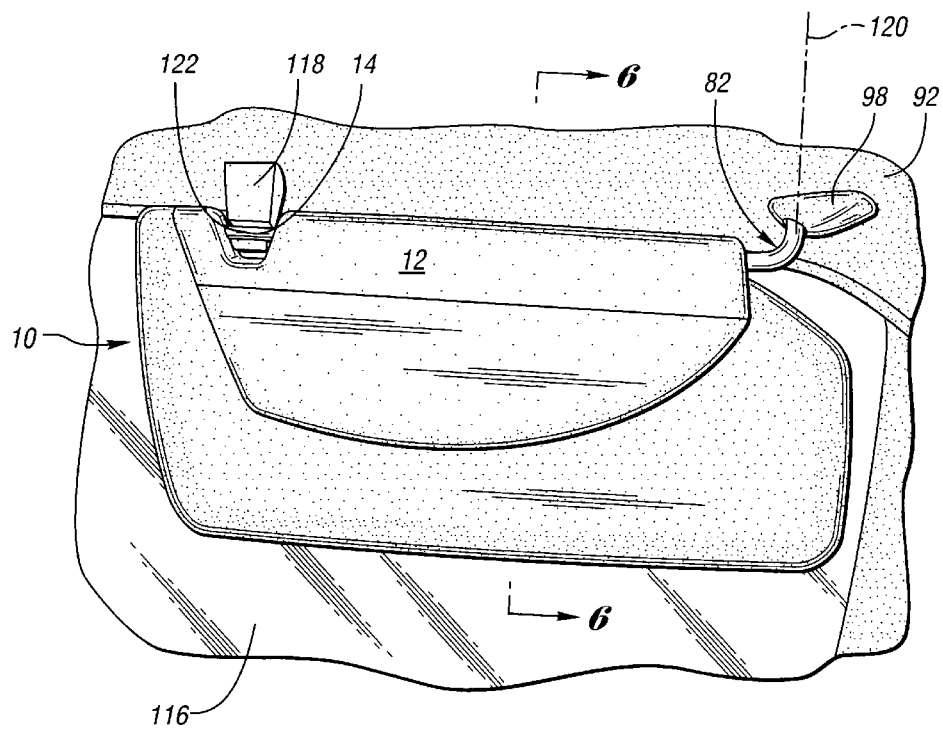
FIG. 5 is a perspective view of the sun visor assembly shown in FIG. 1 attached to a roof portion of the interior of a vehicle.

FIG. 5 shows the sun visor assembly 10 in a first use position, mounted adjacent to a windshield 116 in the interior of a vehicle. The visor bezel 12 is pivotally and slidingly attached to the elbow rod subassembly 74, of which, the only visible components are the elbow rod 82 and the trim cap 98. A center support 118 is mounted to the roof portion 92 of the vehicle, and is configured to accept the center support rod 14 of the visor bezel 12. When the center support rod 14 is held by the center support 118, the sun visor assembly 10 is adjacent to the windshield 116. However, the center support rod 14 is easily released from the center support 118 such that an occupant may pivot the sun visor assembly 10 about an axis of rotation 120 to a second use position adjacent to a side window (not shown).

Because the size of the visor bezel 12 remains constant despite the use of differently sized visor blades, the distance between a center point 122 on the center support rod 14, and the axis of rotation 120 also remains constant. As used in this context, the word "constant" takes into account variations within the allowable manufacturing and assembly tolerances. Thus, the center support 118 can be attached to a roof portion in the same location on many different makes and models of vehicles. This helps to reduce both design and production costs for vehicle manufacturers by eliminating one of the variables encountered when changing vehicle platforms. In addition, the vehicle manufacturer need not produce or inventory different sizes of center supports, since the center support 118 will accommodate all of the sun visor assemblies made in accordance with the present invention. Thus, a clear benefit is realized both by the manufacturer of the sun visor assembly 10 and the manufacturer of the vehicle. Not only are production costs reduced because there are fewer differently sized components to produce, but inventory costs are lowered as well, since there are fewer differently sized components to warehouse.

Figure 6:
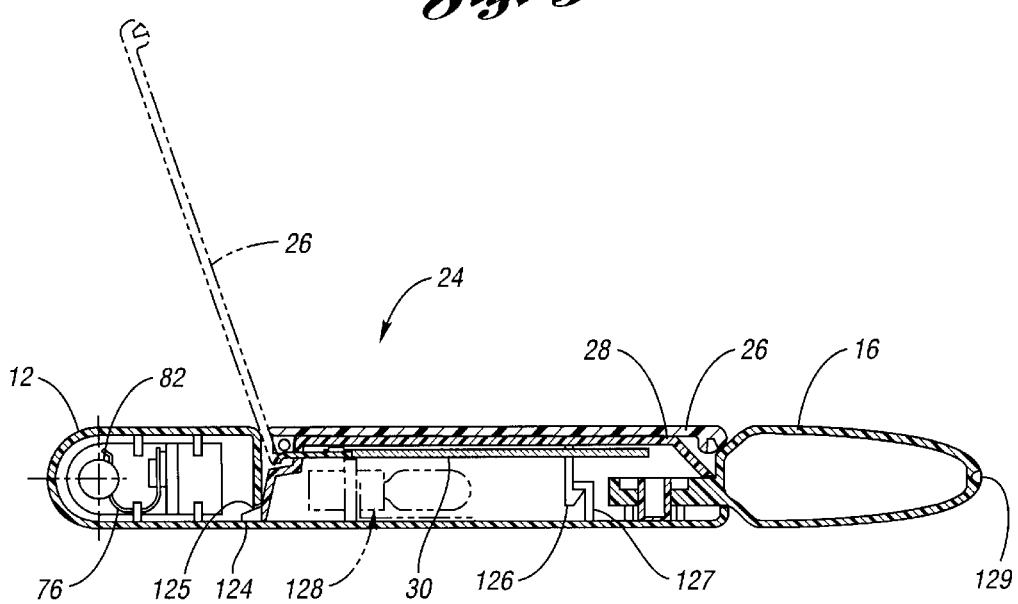
FIG. 6 is a side sectional view of the sun visor assembly shown in FIG. 5, taken through line 6—6.

FIG. 6 is a sectional view of the sun visor assembly 10 taken through line 6—6 in FIG. 5. In this embodiment, the vanity bezel 28 is secured to the visor bezel 12 by two sets of snap legs 124, 126. A first set of snap legs 124 (only one of which is visible in FIG. 6), mates with apertures 125 in the visor bezel 12. A second set of snap legs 126 (see also FIG. 9), mates with retainers 127. It is, of course, understood that other methods of attachment can be employed. For example, the visor blade 16, rather than the visor bezel 12, may be configured with a retainer to mate with the snap legs 126. Alternatively, other forms of attachment may be used, such as metal clips which are not integral with the vanity bezel, but rather, are attached in an assembly operation. As described above, the vanity subassembly 24 is not illuminated; however, a light assembly 128, shown in phantom in FIG. 6, represents one possible configuration for an illuminated vanity subassembly. Also shown in FIG. 6 is a recessed portion 129 of the visor blade 16. The recessed portion 129 provides a space for the edge 110 of the visor blade cover 104, which may form a seam when the first and second portions 106, 108 of the cover are welded together. The vanity lid 26 is shown in FIG. 6 both in a closed position (solid lines), and in an open position (phantom lines). The vanity lid 26 pivots about lid pivot pins 34, each pin 34 being integral with a lid cam 130 (see FIGS. 7 and 8).

Hooks 132, shown in FIG. 9, are integral with the vanity bezel 12, and provide points of attachment for the lid pivot pins 34. The lid springs 32 are inserted through slots 134 in the vanity bezel 28, and are attached to spring mounting pads 136 (see also FIG. 7). Apertures 138 in the lid springs 32 are placed over a shoulder (not visible) on the mounting pads 136, and are heat staked in place. Thus, the lid springs 32, working with the lid cams 130, keep the visor lid 26 in a closed position when it is not in use, and keep the lid 26 in an open position when a vehicle occupant is accessing the mirror.

The embodiments described above each include a vanity subassembly. This feature not only provides a convenience to vehicle occupants, but vanity subassemblies may also cover heat stake attachment points of the visor bezel 12 and the visor blade 16, thus enhancing the aesthetic appearance of the sun visor assembly 10. Of course, a vanity subassembly is not a required feature, but rather is optional. Indeed, an overall cost savings may be realized by eliminating the vanity subassembly. One alternative is to use a cover plate 140, as shown in FIG. 10. Similar to a visor bezel, the cover plate 140 has two sets of snap legs 142, 144, that mate with the apertures 125 and retainers 127, respectively. This further illustrates the benefits of the present invention, which contemplates the use of optional features, rather than restricting a designer within a narrowly defined set of parameters. Thus, the sun visor assembly of the present invention can be modified to suit the particular needs of a customer's specific application, while maintaining compatibility with the other sun visor components. This invention strikes a balance between commonizing components to help reduce production and inventory costs, and allowing enough flexibility to suit the needs of different customers.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system of modular sun visors, comprising:
   a plurality of visor bezels, each visor bezel having a support structure;
   a plurality of visor blades, each of the visor blades differing from the other visor blades by at least one dimension, and each of the visor blades being configured for attachment to any one of the visor bezels.

2. The system of modular sun visors of claim 1 for use in a vehicle, further comprising a plurality of elbow rod subassemblies, each of the elbow rod subassemblies having a first portion configured to allow pivotal and sliding attachment of any of the visor bezels to the first portion, and a second portion configured to be pivotally attached to the vehicle.

3. The system of modular sun visors of claim 1, further comprising a plurality of vanity subassemblies, each of the vanity subassemblies being configured for attachment to any of the visor bezels.

4. The system of modular sun visors of claim 3, wherein each of the vanity subassemblies comprises a mirror, a vanity bezel, and a vanity lid.

5. The system of modular sun visors of claim 1, wherein each of the visor blades includes a first portion configured to be heat staked to any of the visor bezels.

6. The system of modular sun visors of claim 5, further comprising a plurality of cover plates, each cover plate being configured for attachment to any of the visor bezels.

7. The system of modular sun visors of claim 1, further comprising a plurality of visor blade covers, each sun visor blade cover being configured to be disposed over at least a portion of a corresponding visor blade.

8. The system of modular sun visors of claim 7, wherein each visor blade cover comprises a cover subassembly, including a plurality of cover portions welded together to form the cover subassembly.

9. A method of assembling a sun visor for a vehicle, comprising:
   providing a visor bezel having a support structure and configured to be attached to any visor blade chosen from an inventory of differently sized visor blades;
   choosing a visor blade from the inventory of differently sized visor blades; and
   attaching the chosen visor blade to the visor bezel.

10. The method of claim 9 further comprising pivotally and slidingly attaching the visor bezel to a first portion of an elbow rod subassembly.

11. The method of claim 9, further comprising pivotally attaching a second portion of the elbow rod subassembly to the vehicle.

12. The method of claim 9, wherein attaching the chosen visor blade to the visor bezel comprises heat staking a first portion of the chosen visor blade to the visor bezel.

13. The method of claim 9, further comprising attaching a vanity subassembly to the visor bezel.

14. The method of claim 13, wherein the vanity subassembly includes a mirror, a vanity bezel, and a vanity lid.

15. The method of claim 9, further comprising attaching a cover plate to the visor bezel.

16. The method of claim 9, further comprising disposing a visor blade cover over at least a portion of the chosen visor blade.

17. The method of claim 16, wherein the visor blade cover comprises a cover subassembly, including a plurality of cover portions welded together to form the cover subassembly.

\* \* \* \* \*